United States Patent [19]

Yokota

[11] Patent Number: 5,338,906

[45] Date of Patent: Aug. 16, 1994

[54] MODULE COVER OF AIR BAG SYSTEM

[75] Inventor: Keishi Yokota, Shiga, Japan

[73] Assignee: Takata Corporation, Tokyo, Japan

[21] Appl. No.: 983,383

[22] Filed: Nov. 30, 1992

[30] Foreign Application Priority Data

Dec. 17, 1991 [JP] Japan .................. 3-333411

[51] Int. Cl.5 .............................................. H01H 9/00
[52] U.S. Cl. .................................................. 200/61.54
[58] Field of Search ..................... 200/61.54–61.57; 280/727, 730–735

[56] References Cited

U.S. PATENT DOCUMENTS

| 3,819,205 | 6/1974 | Dunford et al. | 280/150 AB |
| 4,325,568 | 4/1982 | Clark et al. | 280/731 |
| 4,934,735 | 6/1990 | Embach | 280/731 |
| 5,062,661 | 11/1991 | Winget | 280/731 |
| 5,085,462 | 2/1992 | Gualtier | 280/731 |
| 5,228,362 | 7/1993 | Chen et al. | 74/552 |

FOREIGN PATENT DOCUMENTS

| 4133007A1 | 10/1991 | Fed. Rep. of Germany | B60R 21/16 |
| 4117303 | 1/1992 | Fed. Rep. of Germany | B62D 1/04 |
| 2200814 | 4/1974 | France | B60K 21/20 |

Primary Examiner—A. D. Pellinen
Assistant Examiner—Michael A. Friedhofer
Attorney, Agent, or Firm—Kanesaka & Takeuchi

[57] ABSTRACT

A module cover of an air bag system for a driver has a horn switch actuating portion. The portion is made of a soft material capable of being deformed to sink to the back. The portion is disposed in a surface side of the module cover. A space for mounting a horn switch is formed at the back of the horn switch actuating portion.

6 Claims, 4 Drawing Sheets

MODULE COVER OF AIR BAG SYSTEM

FIELD OF THE INVENTION

The present invention relates to a module cover of an air bag system and, more particularly, to a module cover of an air bag system for a driver, which is improved in a horn switch mounting structure.

DESCRIPTION OF THE RELATED ART

As is well known in the art, an air bag system for a driver is attached to a center of a steering wheel. If an automobile encounters an emergency such as a collision, an inflator is triggered to inflate an air bag. At this time, a module cover covering the air bag is torn to allow the air bag to extend into a cabin so that the driver may be protected against the steering wheel.

A horn switch may be mounted in the module cover. An essential portion of the air bag system of the prior art having the horn switch is shown in section in FIG. 5. FIG. 5 presents a section similar to that of FIG. 1 showing an embodiment of the present invention described in detail later.

A module cover 10 is recessed from its surface side (as located at an upper side of FIG. 5) facing a cabin of an automobile, to form a horn switch mounting portion 12 having a horn switch 14 mounted therein. This horn switch 14 is constructed to include: a housing 16; a switch plate 18 insert-molded in the housing 16; a switch piece 20 adapted to be brought into and out of contact with the switch plate 18; a spring 22 for urging the switch piece 20 apart from the switch plate 18; a horn button portion 24 having the switch piece 20 insert-molded therein; and a lead wire 28 connected with the switch plate 18. Numeral 28 denotes a spoke of a steering.

Thus, the horn of the automobile blows when-the horn button portion 24 is depressed to bring the switch piece 20 into contact with the switch plate 18.

The horn switch mounting structure using the module cover of the air bag system of the prior art described above is accompanied by a problem that a clearance is left between the outer circumferential edge of the horn button portion 24 and the housing 16 to admit moisture or dust into the horn switch 12.

OBJECT AND SUMMARY OF THE INVENTION

An object of the present invention is to provide a module cover for preventing any moisture or dust from entering into a horn switch of an automobile.

According to a first aspect of the present invention, there is provided a module cover of an air bag system for a driver, which is to be attached to a steering. The module cover is characterized in that a horn switch actuating portion made of a soft material capable of being deformed to sink to the back is disposed in a portion of the surface side of the module cover, and in that a space for mounting a horn switch is formed at the back of the horn switch actuating portion.

According to a second aspect of the present invention, in a module cover of an air bag system according to the first aspect, further comprises: a hard inner layer; and a soft outer layer making the horn switch actuating portion exclusively.

According to a third aspect of the present invention, in a module cover of an air bag system according to the second aspect, the horn switch mounting space is defined by a surrounding wall integrated with the inner layer.

According to a fourth aspect of the present invention, in a module cover of an air bag system according to any of the first to third aspects, the horn switch actuating portion in the form of a groove is formed in a peripheral edge portion of its surface for facilitating the recessing of the horn switch actuating portion.

In the module cover of the air bag system according to the present invention, there can be provided a horn switch mounting structure having its horn switch covered in its entirety with the module cover. Thus, the horn switch can be protected against any moisture or dust.

Incidentally, in the air bag system using the module cover of the present invention, the horn can be blown by depressing the horn switch actuating portion made of a soft material with the driver's finger.

In the module cover of the air bag system according to the second aspect, the soft portion can be easily formed as the horn switch actuating portion by making use of the soft outer layer of the module cover having the two-layered structure.

In the module cover of the air bag system according to the third aspect, the horn switch mounting space is surrounded by the hard wall so that it can mount the horn switch easily. Moreover, since the horn switch is surrounded by the hard wall, its durability can be enhanced. Incidentally, the surrounding wall can be molded with the hard inner wall.

In the module cover of the air bag system according to the fourth aspect, the horn switch actuating portion made of the soft material has its outer periphery formed with the groove so that it can be depressed with ease.

DESCRIPTION OF THE PREFERRED EMBODIMENTS

Figure 1:
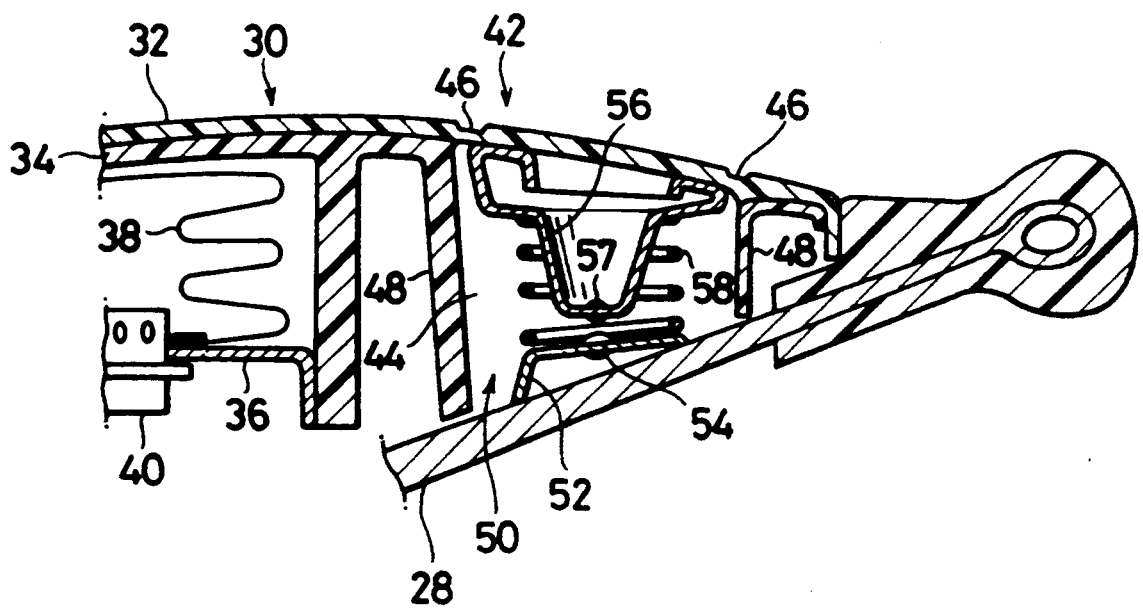
FIG. 1 is a section view taken along a line 1—1 in FIG. 2 for showing an essential portion of an air bag system equipped with a module cover according to an embodiment.
Figure 2:
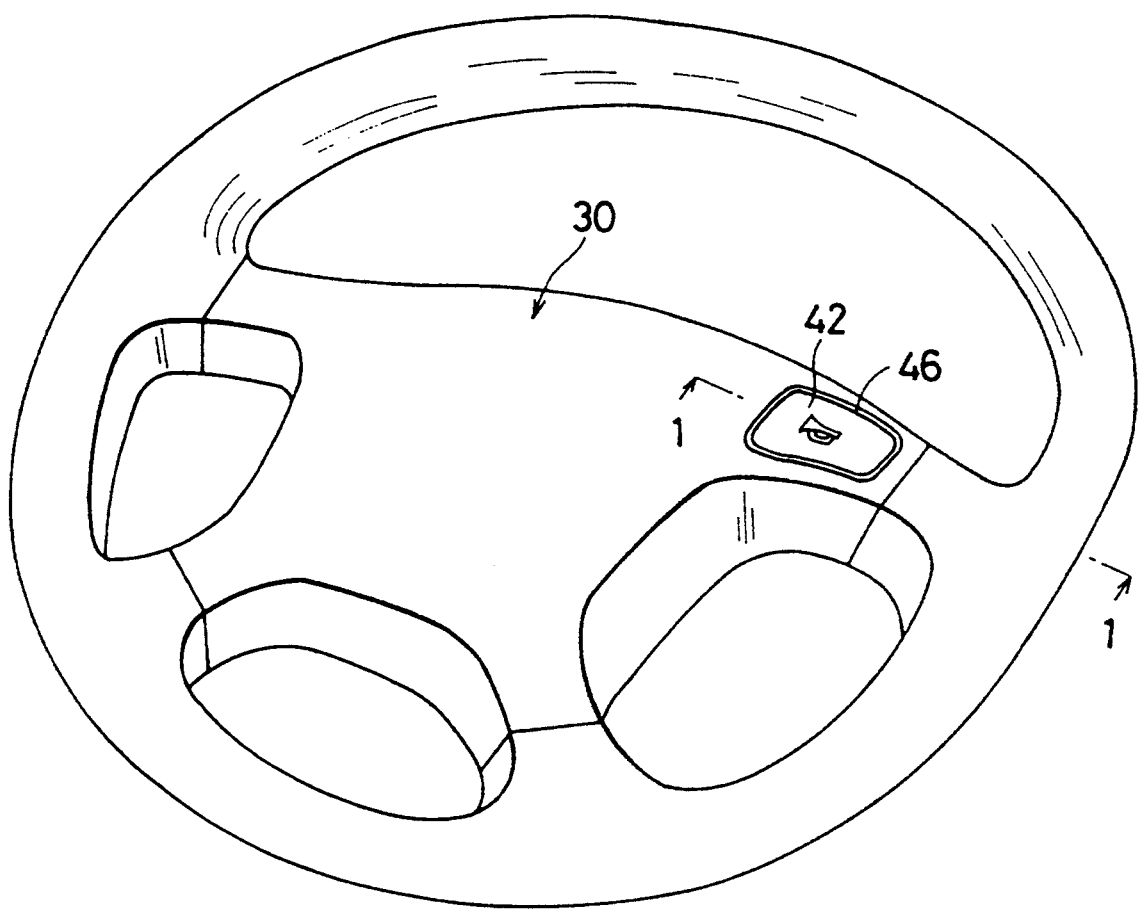
FIG. 2 is a perspective view showing a steering mounting therein the air bag system equipped with the module cover according to the embodiment.
Figure 3:
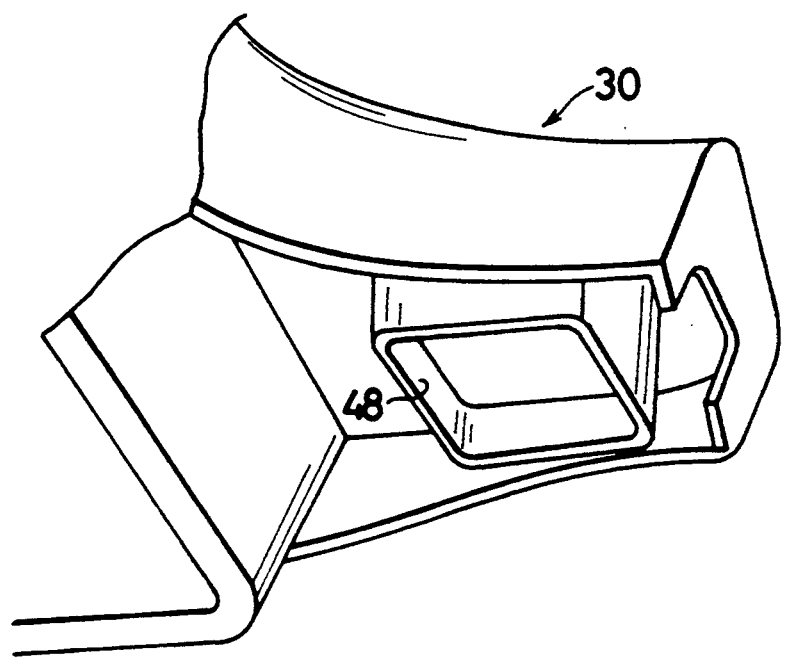
FIG. 3 is a perspective view showing the module cover according to the embodiment and taken from the back thereof.
Figure 4:
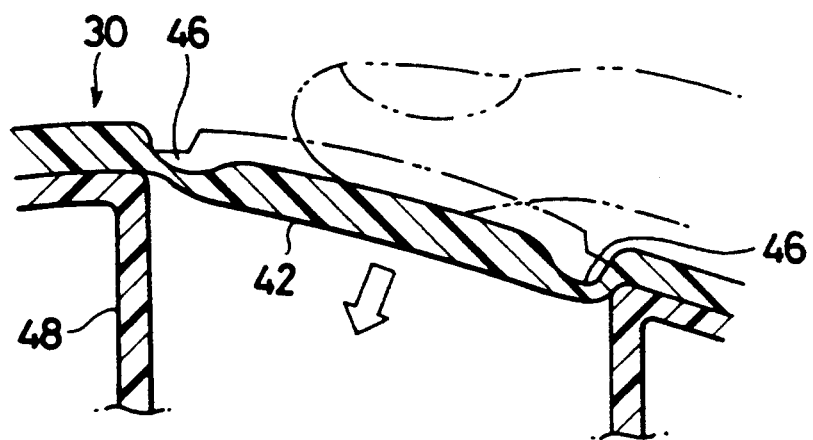
FIG. 4 is a section view for explaining a deformation of the module cover according to the embodiment.
Figure 5:
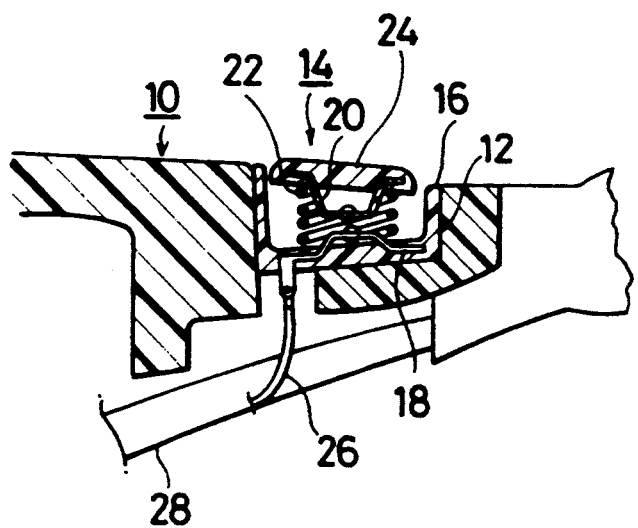
FIG. 5 is a section view showing an example of the prior art.

An embodiment of the present invention will be described in the following with reference to the accompanying drawings. FIG. 1 is a section (taken along line 1—1 of FIG. 2) showing an essential portion of a module cover of an air bag system according to the embodiment of the present invention; FIG. 2 is a perspective view showing a steering wheel equipped with the air bag system using the module cover according to the embodiment; FIG. 3 is a perspective view showing the module cover of the air back system according to the embodiment and taken from the back thereof; and FIG. 4 is a section showing a used example of the module cover according to the embodiment.

This module cover 30 is composed of an outer layer 32 made of a soft synthetic resin and an inner layer 34 made of a hard synthetic resin. The outer layer 32 is directly disposed over the inner layer 34, as shown in FIG. 1. The module cover 30 thus composed can be molded by two-color molding. Numeral 36 in FIG. 1 denotes a retainer of the air bag system, to which is attached an air bag 38. Numeral 40 denotes an inflator which is also attached to the retainer 36. When the inflator 40 operates to release gases, the air bag 38 is inflated to tear the module cover 30 so that it extends largely into a cabin of an automobile.

The module cover 30 thus constructed is provided with a horn switch actuating portion 42. This horn switch actuating portion 42 is formed of the outer layer 32 only and is backed by a space 44 for mounting the horn switch. In order that the module cover 30 may be easily deformed to sink to a back side (i.e., downward of FIG. 1) of the module cover 30 if the horn switch actuating portion 42 is depressed, the horn switch actuating portion 42 is formed in its peripheral edge with a groove 46. This groove 46 is formed in the surface side of the module cover 30.

The horn switch mounting space 44 is surrounded by a wall 48. The surrounding wall 48 has a shape of square tube and is molded integrally with the hard inner layer 34, as shown in FIG. 1.

In the space 44, there is mounted a horn switch 50. The horn switch 50 is composed of include: a switch plate 52; a switch piece 56 having a conductive terminal 57 brought into and away from contact with a conductive terminal 54 of the switch plate 52; and a spring 58 for urging the switch piece 56 apart from the switch plate 52. The switch piece 56 is urged, into abutment against the back side of the horn switch actuating portion 42, by that spring 58.

In the air bag system having the module cover 30 thus constructed and in the steering having the air bag system, the horn is blown when the conductive terminals 54 and 57 are caused to abut against each other by depressing the horn switch actuating portion 42. At this time, the provision of the groove 46 facilitates the deformation of the peripheral edge portion of the horn switch actuating portion 42, as shown in FIG. 4. As a result, the horn switch actuating portion 42 can be depressed by a reasonably weak force.

In the air bag system thus equipped with the module cover 30, the horn switch 50 is covered in its entirety with the module cover 30 so that it is kept away from any moisture or dust. Thus, the horn switch can have a remarkably excellent durability. In the present embodiment, moreover, the horn switch mounting space 44 is surrounded by the wall 48 so that the horn switch 50 can be assembled easily therein.

The module cover 30 has the horn switch actuating soft portion made of the outer layer 32. As a result, the module cover 30 can be formed together with the horn switch actuating portion 42, when it is to be molded in two colors, so that it can be easily manufactured.

Moreover, the air bag system with the horn switch according to the present embodiment is not required to have the horn button portion 24 so that its part number can be made smaller than that of the prior art.

As described above, the module cover of the air bag system according to the present invention can be constructed such that the horn switch is wholly covered with the module cover, thereby to prevent any moisture or dust from entering into the horn switch. As a result, the horn switch can have its durability enhanced remarkably.

The horn switch actuating portion can be easily formed by making use of the soft outer layer of the two-layered module cover.

The horn switch can be easily mounted because its mounting space is surrounded by the hard wall. Moreover, the horn switch can be protected by the hard surrounding wall.

Since the horn switch actuating portion made of the soft material has its outer periphery with the groove, it can be easily deformed to facilitate the horn blowing operation.

What is claimed is:

1. A module cover of an air bag system for a driver attached to a steering wheel having a spoke and a horn switch comprising:

a soft outer layer and a hard inner layer for forming the module cover, said outer layer being substantially directly disposed over the inner layer, a central portion for covering an air bag, an extending portion extending sideway from the central portion and located above the spoke, a horn switch actuating portion formed in the extending portion, said horn switch actuating portion consisting of the soft outer layer and being surrounded by a groove extending inwardly from an outer surface of the soft outer layer, and a space situated between the horn switch actuating portion and the spoke and completely surrounded by a side wall, said side wall being integrally formed with the inner layer and extending downwardly and substantially perpendicularly from the outer layer toward the spoke so that the horn switch fixed on the spoke is located in the space under the horn switch actuating portion.

2. A module cover according to claim 1, wherein said side wall ha length extending form a portion beneath the outer layer to a portion substantially contacting the spoke in a condition that the horn switch actuating portion is not depressed, to thereby protect the horn switch situated inside the space.

3. A module cover according to claim 2, wherein said side wall is located outside the groove.

4. A module cover according to claim 1, wherein said horn switch is formed separately form the module cover and is fixed to the spoke and situated inside the space so that when the horn switch is pushed, the horn switch is depressed to blow horn.

5. A module cover of an air bag system for a driver attached to a steering wheel having a spoke and a horn switch, comprising:

a soft outer layer and a hard inner layer for forming the module cover, said outer layer being substantially directly disposed over the inner layer, a central portion for covering an air bag, an extending portion extending sideway from the central portion and located above the spoke, a horn switch actuating portion formed in the extending portion, said horn switch actuating portion consisting of the soft outer layer and being surrounded by a groove extending inwardly from an outer surface of the soft outer layer, and a space situated between the horn switch actuating portion and the spoke and completely surrounded by a side wall, said side wall being integrally formed with the inner layer and extending downwardly and substantially perpendicularly from the outer layer toward the spoke, said horn switch being formed separately from the module cover and being fixed to the spoke and situated inside the space under the horn switch actuating portion, said horn switch being formed of a first switch plate located on the spoke, a second switch plate located at a portion opposite to the first switch plate, and a spring disposed between the first and second switch plates to urge the second switch plate toward the horn switch actuating portion so that when the horn switch is pushed, the horn switch is depressed to blow horn.

6. A module cover according to claim 5, wherein said side wall is located outside the groove and has length extending from a portion beneath the outer layer to a portion substantially contacting the spoke in a condition where the horn switch actuating portion is not depressed, to thereby protect a horn switch situated inside the space.

* * * * *